Patented Apr. 10, 1923.

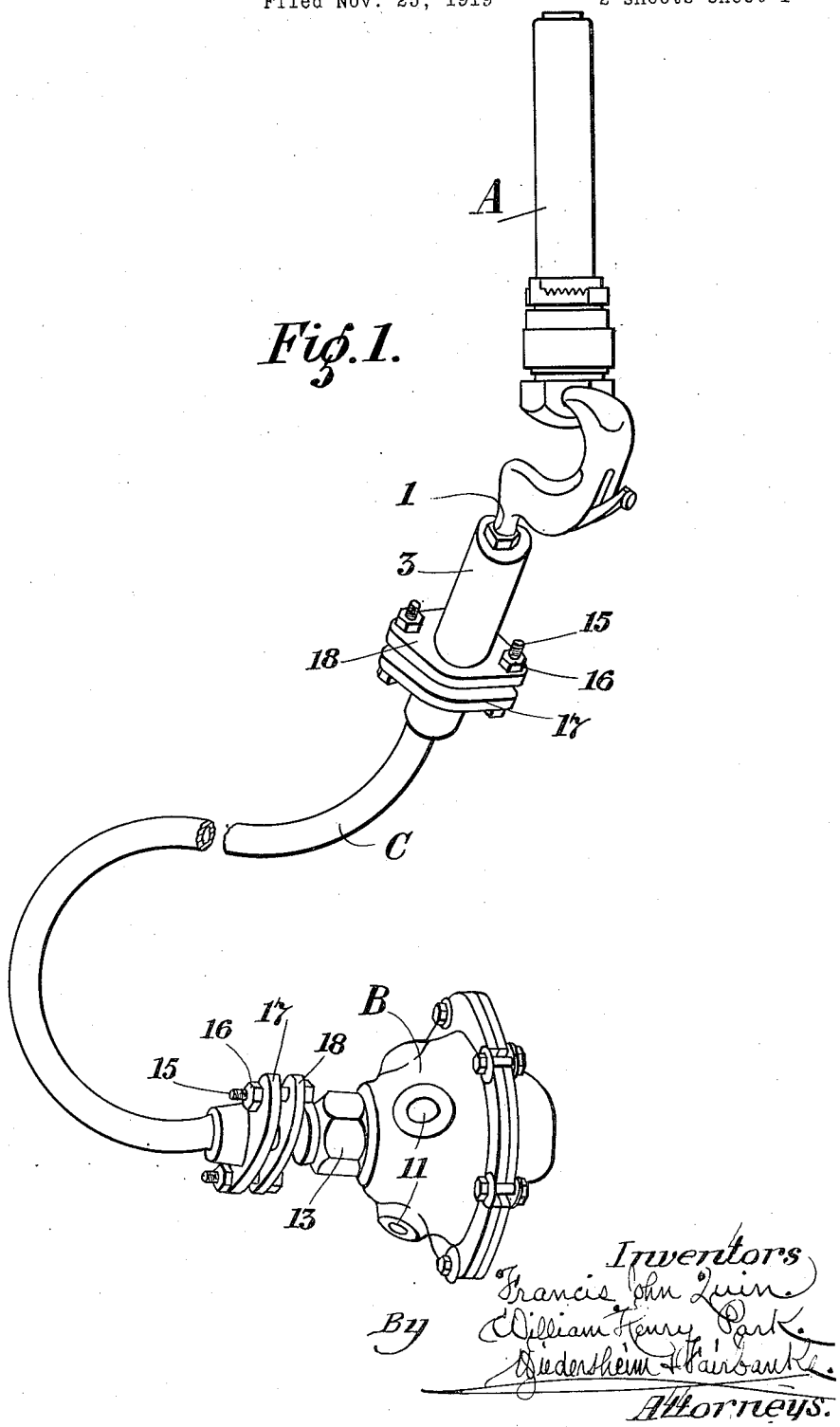

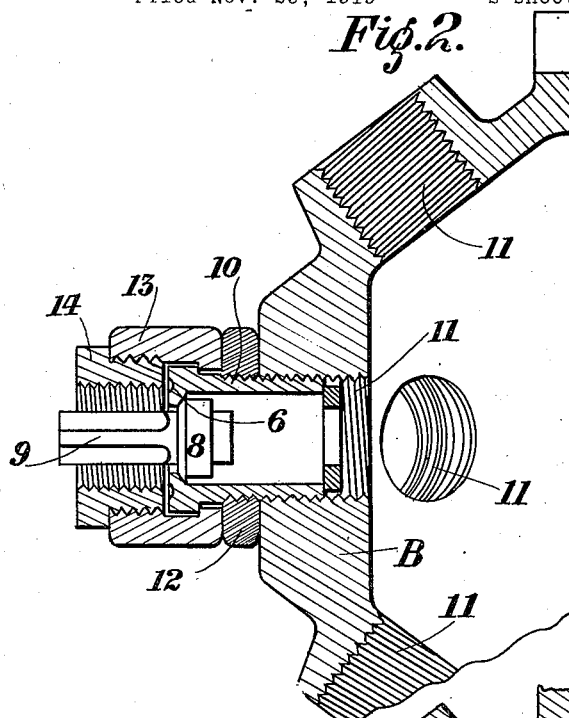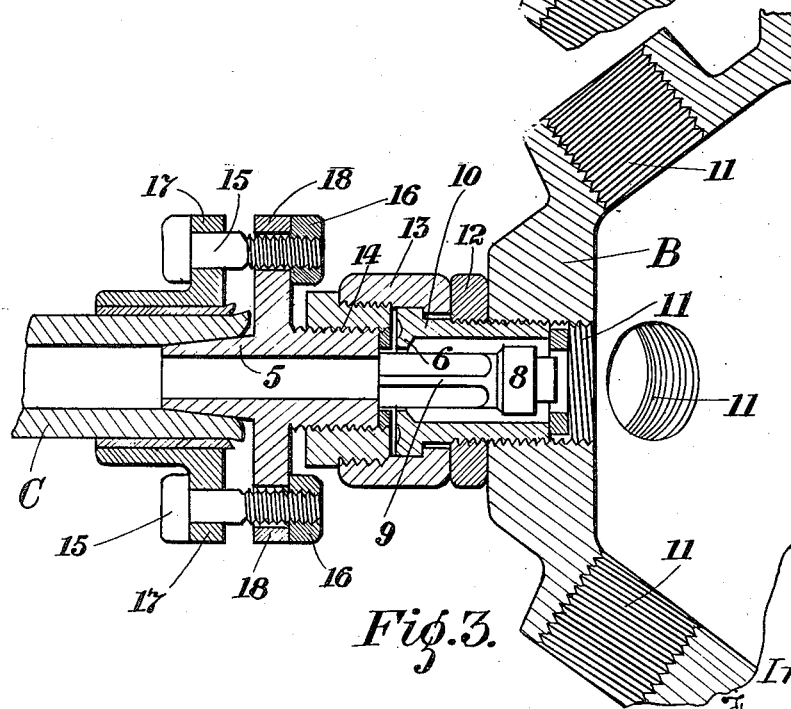

1,451,372

UNITED STATES PATENT OFFICE.

FRANCIS JOHN QUIN AND WILLIAM HENRY PARK, OF BELFAST, IRELAND.

AUTOMATIC VALVE FOR PNEUMATIC-HOSE FITTINGS.

Application filed November 25, 1919. Serial No. 340,502.

*To all whom it may concern:*

Be it known that we, FRANCIS JOHN QUIN and WILLIAM HENRY PARK, both subjects of the King of Great Britain and Ireland, residing at Belfast, Ireland, have invented certain new and useful Automatic Valves for Pneumatic-Hose Fittings, of which the following is a specification.

This invention relates to pneumatic hose fittings or couplings and its object is to provide improved means, including a valve and valve member, whereby the supply of compressed air is automatically cut off when the fittings are disconnected or uncoupled and is reestablished when the fittings are again connected or recoupled.

The means by which we accomplish this object are illustrated in the accompanying drawings and are hereinafter specifically described. That which we believe to be new is set forth in the claims.

In the drawings:—

Fig. 1 is a general view showing a pneumatic hammer and strainer operatively connected by flexible hose and embodying our improved hose fitting or coupling.

Figs. 2 and 3 are detail views of the fitting as used between the strainer and hose, Fig. 2 showing the hose disconnected and the valve of the fitting closed under air pressure and Fig. 3 showing the connection made and the valve opened thereby.

Referring to the drawing, A indicates the pneumatic hammer, B the strainer, and C the flexible hose which serves to operatively connect the same. Compressed air is supplied to the strainer from any suitable source and is conducted by the hose to the hammer where its energy is expended in operating the hammer plunger in the usual manner.

As shown at Figs. 2 and 3, a valve member 10 is screwed into one of the openings 11 in the wall of the strainer and is locked in position by a nut 12. The member 10 is made with an internal annular flange 6, forming a seat for a valve 8 located in the member and having a stem 9 projecting beyond the flange or seat 6. A coupling nut 13 rotatable on the member 10 carries an adaptor 14 which, by the rotation of the nut 13, is capable of being screwed over the threaded end of a spigot 5, attached to the hose C.

As the screw threaded end of the spigot 5 enters the adaptor 14 it presses against the valve stem 9 and moves the valve from its seat to the open position shown in Fig. 3. When the hose with the spigot piece 5 is disconnected (Fig. 2) the valve moves automatically against its seat and is held closed by the pressure of the compressed air.

In some cases the adaptor 14 may be omitted and the screw thread on the spigot 5 made to engage the coupling nut direct.

The spigot piece 5 is conveniently attached to the hose C by means of bolts 15 and nuts 16 connecting a flange 17 on the hose with a flange 18 which is formed integral with the spigot piece.

Each opening 11 in the wall of the strainer B would be provided with a valve member 10 and valve 8 for the attachment of flexible hose but for convenience of illustration such additional members and valves have been omitted.

The tool A, Fig. 1, is shown connected to the hose C in a similar manner through the medium of a sleeve or member 3 having a valve which is adapted to be moved from its seat when the threaded extension 1 of the tool is screwed into said member.

From the foregoing it will be apparent that we have provided a simple and efficient fitting for use in coupling pneumatic hose and by means of which the hose can be coupled and uncoupled with safety and without loss of compressed air.

Having now fully described our invention what we claim and desire to secure by Letters Patent is:—

1. Means for coupling pneumatic hose to a pneumatic strainer, comprising, in combination, a tubular member secured to the strainer and in communication with the compressed air supply, a valve seat within said member and a valve normally closed against said seat by the pressure of the compressed air, a coupling nut rotatable on said member, a spigot on the hose adapted to be engaged by the coupling nut, and means coacting with said valve whereby it is moved from its seat when the spigot is engaged.

2. Means for coupling pneumatic hose to a pneumatic strainer, comprising in combination, a tubular member secured to the strainer and in communication with the compressed air supply, a valve seat within said member, a valve fitted to said valve seat and having a stem portion normally projecting beyond the same, a coupling nut rotatable on said member, and a tubular spigot piece adapted to engage said coupling nut and simultaneously to move the valve in the member from its seat.

3. In a device of the character stated, a pneumatic strainer having a threaded opening therein, a tubular member secured in said opening and provided at its forward portion with a valve seat, a valve within said member and having its stem projecting through and beyond said seat when the valve is seated, a coupling nut engaging said tubular member, an adaptor in engagement with said coupling nut, and a spigot in engagement with said adaptor, the end of said spigot juxtaposed to said valve stem being adapted to unseat said valve when the spigot is assembled in said adaptor, said valve being automatically seated by pneumatic pressure when said spigot is disengaged from said adaptor.

4. The combination of a strainer, a tubular member secured thereto and having a valve seat therein, a valve in said member, a stem on said valve normally projecting through and beyond said seat when said valve is seated, a spigot, and coupling means common to said spigot and tubular member, the end of said spigot juxtaposed to said valve seat being adapted to contact therewith and unseat said valve when said coupling devices are tightened, and said valve being automatically seated by fluid pressure when said spigot is disengaged from said coupling devices and moved out of contact with said valve stem.

In testimony whereof we affix our signatures in presence of two witnesses.

FRANCIS JOHN QUIN.
WILLIAM HENRY PARK.

Witnesses:
ANDREW HAMILTON,
HARRY WALTER ALLSOP.